US007890636B2

(12) United States Patent
Grayson et al.

(10) Patent No.: US 7,890,636 B2
(45) Date of Patent: Feb. 15, 2011

(54) APPLICATION INTEGRATED GATEWAY

(75) Inventors: Mark Grayson, Maidenhead (GB);
Jayaraman Iyer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 381 days.

(21) Appl. No.: 11/477,977

(22) Filed: Jun. 28, 2006

(65) Prior Publication Data

US 2008/0005300 A1 Jan. 3, 2008

(51) Int. Cl.
*G06F 15/16* (2006.01)
(52) U.S. Cl. .................. 709/227; 709/203; 709/218; 709/228; 709/229
(58) Field of Classification Search .................. None
See application file for complete search history.

(56) References Cited

U.S. PATENT DOCUMENTS

| 6,445,695 | B1 | | 9/2002 | Christie, IV | |
|---|---|---|---|---|---|
| 6,549,934 | B1 | * | 4/2003 | Peterson et al. | 709/203 |
| 6,842,766 | B2 | * | 1/2005 | Brockway et al. | 709/203 |
| 6,886,169 | B2 | * | 4/2005 | Wei | 719/316 |
| 6,892,224 | B2 | * | 5/2005 | Strahm et al. | 709/213 |
| 7,003,571 | B1 | * | 2/2006 | Zombek et al. | 709/227 |
| 7,020,707 | B2 | | 3/2006 | Sternagle | |
| 7,149,819 | B2 | * | 12/2006 | Pettey | 709/250 |
| 7,433,841 | B2 | * | 10/2008 | Byde et al. | 705/37 |
| 7,444,536 | B1 | * | 10/2008 | Jairath | 714/4 |
| 2003/0004746 | A1 | * | 1/2003 | Kheirolomoom et al. | 705/1 |
| 2003/0058839 | A1 | * | 3/2003 | D'Souza | 370/352 |
| 2003/0105977 | A1 | * | 6/2003 | Brabson et al. | 713/201 |
| 2003/0217149 | A1 | * | 11/2003 | Crichton et al. | 709/225 |
| 2004/0057442 | A1 | * | 3/2004 | Westman et al. | 370/401 |
| 2004/0114578 | A1 | * | 6/2004 | Soncodi et al. | 370/352 |
| 2004/0148425 | A1 | | 7/2004 | Haumont et al. | |
| 2004/0223489 | A1 | * | 11/2004 | Rotsten et al. | 370/352 |
| 2005/0159156 | A1 | * | 7/2005 | Bajko et al. | 455/435.1 |
| 2005/0198363 | A1 | * | 9/2005 | Ling et al. | 709/236 |
| 2006/0002292 | A1 | * | 1/2006 | Chang et al. | 370/225 |
| 2006/0090097 | A1 | * | 4/2006 | Ngan et al. | 714/6 |
| 2006/0098624 | A1 | | 5/2006 | Morgan | |
| 2006/0271681 | A1 | * | 11/2006 | Apreutesei et al. | 709/226 |
| 2007/0256055 | A1 | * | 11/2007 | Herscu | 717/115 |
| 2009/0138574 | A1 | * | 5/2009 | Hui et al. | 709/219 |

OTHER PUBLICATIONS

3GPP TS 24.229 v7.3.0; $3^{rd}$ Generation Partnership Project; Stage 3 (Release 7) Mar. 2006.

* cited by examiner

*Primary Examiner*—Kenny S Lin
*Assistant Examiner*—Angela Widhalm
(74) *Attorney, Agent, or Firm*—Patent Capital Group

(57) ABSTRACT

In one embodiment, a network application may offload stateful operations to a user-plane application. In one embodiment, the network application receives state information for a user device. The network application then sends the state information to a user-plane application, which can maintain the state information. The network application may then offload a stateful operation to the user-plane application. For example, the network application may have the user-plane application perform stateful operations. Also, the network application may use the state information maintained at the user-plane application for error recovery after the network application fails. For example, the network application may recover the state information from the user-plane application after failure.

36 Claims, 11 Drawing Sheets

APPLICATION INTEGRATED GATEWAY

BACKGROUND OF THE INVENTION

Embodiments of the present invention generally relate to telecommunications and more specifically to techniques for providing an interface to allow a network application to offload stateful operations to a user plane function.

When an entity moves from a legacy system to an internet protocol (IP) system, certain decisions have to be made on how to architect the IP system. Legacy systems provide reliability and if this reliability is to be preserved, the entities may use a big iron approach to the IP service deployment. The big iron approach uses fault-tolerant hardware and stateful inspection. This approach, however, ignores the load balancing and system-wide resilience capabilities that are provided by an IP system. Further, fault-tolerant big iron systems are often costly to deploy. This minimizes the advantages for switching to an IP system.

Applications in IP systems also require that functionality be stateful to meet the business requirements of the service providers. For example, in a wireless domain, users may commence an IP session while in radio coverage. However, due to changing conditions, such as user movement, degraded radio coverage, or loss of connectivity, the user may lose connectivity. Without maintaining state for the user, the session may hang because a system needs to associate the IP session with the user who has lost coverage. Accordingly, service providers need to define functionality that uses state to clear up the sessions on behalf of the user who has lost radio coverage.

In other examples, functionality also requires stateful operation when policing session initiation protocol (SIP) messages. Service providers may require that SIP messages from a user pass through a specific service provider element (such as a SIP proxy) that is used to generate billing information or used to include subscriber policy information as to how to route the particular SIP message. Functionality is defined to provide a stateful solution for the SIP proxy. For example, upon registration, the SIP proxy may receive a SIP service-route header that is used to make sure messages are routed through the SIP proxy. However, some users may try to circumvent the service provider charging and policy control by including information in the IP message that causes the SIP message not to be routed through the SIP proxy. For example, a user may ignore the service-route header and insert another set of routes in the route header to cause the SIP message to avoid passing through the SIP proxy. To combat this scenario, the edge proxy may be used to police the SIP messages to ensure that they are routed through the desired element. For example, an edge proxy may maintain the state information by caching the service route header. The edge proxy then polices any SIP messages received from the user and can make sure the correct service route header is included in the SIP messages. This, however, requires that the edge-proxy be stateful.

DETAILED DESCRIPTION OF EMBODIMENTS OF THE INVENTION

In one embodiment of the present invention, a network application may offload stateful operations to a user-plane application. In one embodiment, the network application receives state information for a user device. The network application then sends the state information to a user-plane application, which can maintain the state information. The network application may then offload a stateful operation to the user-plane application. For example, the network application may have the user-plane application perform stateful operations. Also, the network application may use the state information maintained at the user-plane application for error recovery after the network application fails. For example, the network application may recover the state information from the user-plane application after failure.

Figure 1:
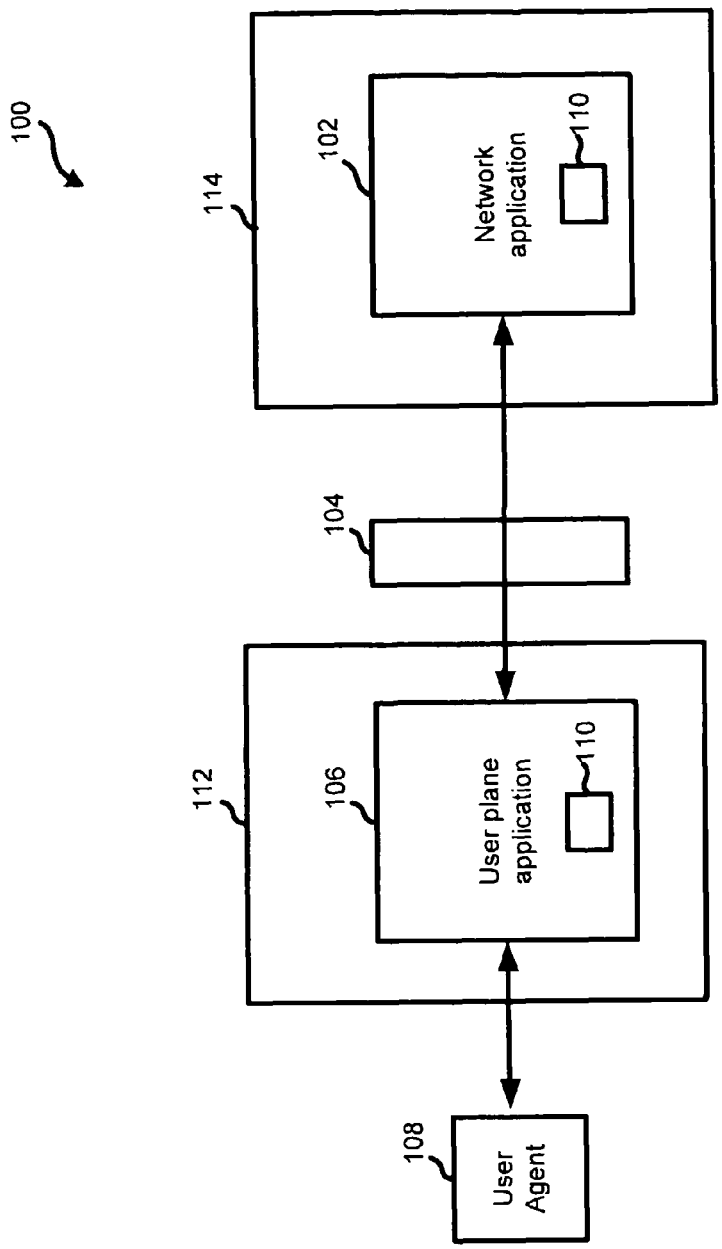
FIG. 1 depicts a system for providing offloading of stateful application specific operations to a user-plane application according to one embodiment of the present invention.

FIG. 1 depicts a system 100 for providing offloading of stateful network application specific operations to a user-plane application according to one embodiment of the present invention. As shown, a network application 102, an interface 104, a user-plane application 106, and a user agent 108 are provided.

Network application 102 is an application that performs a function. Network application 102 may be part of a network device 114, such as a server, an edge proxy, switch, or any other network device.

User-plane application 106 is an application that performs a function in a user plane. User plane application 106 may be included in a gateway 112, which may be a network element that is associated with user agent 108. For example, gateway 112 may include a security offload device, deep packet inspection device, or any combination thereof. In one embodiment, user-plane application 106 is located in a network associated with user agent 108.

User agent 108 may be a client application associated with a particular network protocol, such as SIP. In one embodiment, user agent 108 may be part of a client device, such as a soft phone, instant messaging client, server, router, or any other device.

Interface 104 is provided to allow network application 102 to offload to user-plane application 106. State information 110 may be sent through interface 104 to user-plane application 106. User-plane application 106 may then maintain state information 110.

The transfer of state information 110 through interface 104 to user-plane application 106 allows network application 102 to operate in a stateless manner. For example, network application 102 may offload stateful operations to user-plane application 106 through interface 104. Also, if network application 102 fails and thus loses state information 110, user-plane application 106 may be used to recover lost state information 110. Thus, network application 102 is not required to be stateful.

Interface 104 allows network application 102 to be integrated with user-plane application 106. This is even though they may not be located within the same device. This allows communication between network application 102 and user-plane application 106 to offload stateful operations.

Network application 102 and user-plane application 106 maybe operated by different entities. For example, a first service provider may operate a first network application 102 and a second service provider may operate a second network application 102. The two service providers may share user-plane application 106.

Embodiments of the present invention will be described further with respect to FIGS. 2-11. Although these embodiments are described, it will be recognized that variations will be appreciated.

Session Initiation

Figure 2:
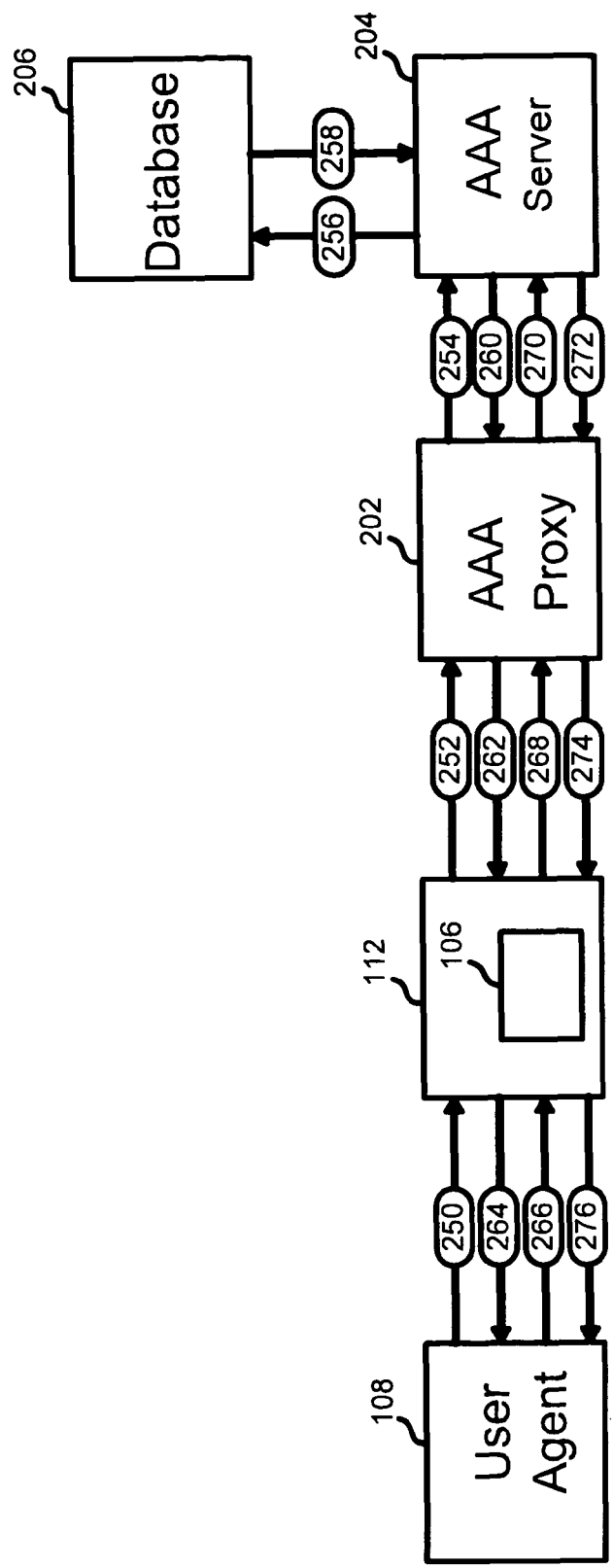
FIG. 2 depicts a process for initiating an IP session according to one embodiment of the present invention.

FIG. 2 depicts a process for initiating an IP session according to one embodiment of the present invention. In one embodiment, user agent 108 may be a host. The host may be a SIP device, such as a user end-device. At 250, user agent 108 sends an activation request. The activation request may be used to trigger credentials checking that is needed to authorize communication in a network.

User-plane application 106 may be included in gateway 112. A host accesses the network through gateway 112. For example, a gateway may be at the edge of a local area network (LAN) and provides access to a wide area network (WAN).

At 252, user-plane application 106, in one embodiment, sends a radius access request to AAA proxy 202. Although a radius access request is discussed, it will be recognized that other protocols may be used and also other methods of confirming credentials may be appreciated. At 254, AAA proxy 202 sends the radius access request to AAA server 204.

AAA server 204, at 256 and 258, recovers credentials from database 206. For example, information for the host, such as an identifier, may be used to recover credentials for the host.

At 260 and 262, a radius access challenge is sent from AAA server 204 to user-plane application 106 through AAA proxy 202. At 264, user-plane application 106 sends a challenge to user agent 108. The challenge is used to ensure that user agent 108 is a valid host.

At 266, user agent 108 sends a challenge response to user-plane application 106. At 268 and 270, a radius access request is sent to AAA server 204. If the challenge response is valid, at 272 and 274, a radius access accept is sent to user-plane application 106.

At this point, user-plane application 106 may build access state. The access state may be a source IP allocated to the user, a description of the access network being used, e.g., radio technology and/or cell identity, etc. The access state is access specific state rather than application specific state. In building the access state, user-plane application 106 may store the credentials for user agent 108.

At 276, user-plane application 106 confirms with user agent 108 that the activation has been completed and also sends an IP address and an address to user agent 108. For example, an address is sent to network application 102, such as a proxy call server control function (P-CSCF). Accordingly, user agent 108 has now initiated an IP session and received an IP address. User agent 108 may then register with a network application 106 in the network.

Registration

Figure 3:
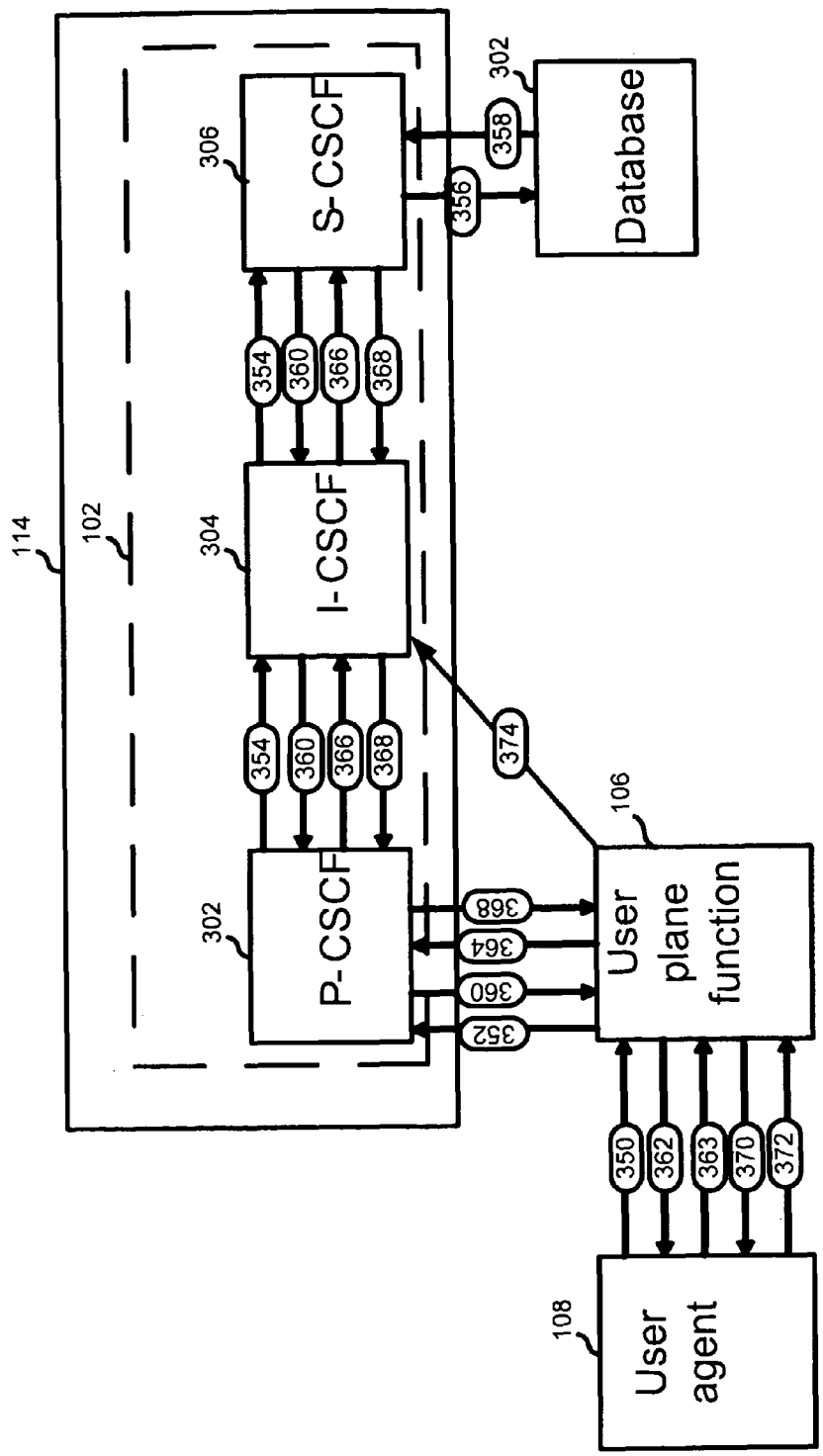
FIG. 3 depicts a process for registering with a network according to one embodiment of the present invention.

FIG. 3 depicts a process for registering with a network according to one embodiment of the present invention. After receiving the address for network application 102, such as a P-CSCF 302, user agent 108 may register with a network application 106 in the network, such as an IP multimedia subsystem (IMS). At 350, a registration request is sent to user-plane application 102. User-plane application 106, at 352, sends the registration request to network application 102. For example, network application 102 may include a P-CSCF 302, an interrogating-CSCF (I-CSCF) 304, and a serving-CSCF (S-CSCF) 306. P-CSCF 302, I-CSCF 304, and S-CSCF 306 may be applications that are configured to perform one or more functions. When P-CSCF 302, I-CSCF 304, and S-CSCF 306 are discussed, it will be understood that is may be an embodiment of network application 106. A registration request is passed through P-CSCF 302, I-CSCF 304, and S-CSCF 306.

At 356 and 358, S-CSCF 306 recovers credentials for user agent 108. The credentials that may be recovered include the access credentials determined in FIG. 2. However, logically distinct credentials may be determined instead of using the access credentials. At 360, a challenge response is sent from network application 102 to user-plane application 106. The challenge response is a challenge that requires a response to validate user agent 108. At 362, user plane function 106 sends a challenge response to user agent 108. At 363, the user agent 108 responds to the challenge response, e.g., by sending a second registration request including the response to the challenge response. At 364, user-plane application 106 then sends the response to network application 102. At 366, the response is routed to S-CSCF 306.

S-CSCF 306 may determine if the response is valid. If so, at 368, a response indicating that the challenge response is valid is sent back to user-plane application 106. In one embodiment, the response may be a SIP 200 OK response. The OK response may include a service route header. The service route header may be the header that should be included in communications from user agent 108. The service route header causes messages to be routed through a network device (i.e., a network device associated with P-CSCF 302).

At 370, user-plane application 106 sends the 200 OK response with the service route header to user agent 108.

User agent 108 then generates security information. For example, IPSec security association information may be generated by user agent 108. Also, user agent 108 may offload the encryption and decryption to another device.

At 372, user agent 108 sends an invite message protected with the IPSec security information. Network application 102 decrypts the invite message and sends a decrypted invite message, at 374, to I-CSCF 304.

Accordingly, user agent 108 is now registered with the network and can send messages using the service route header. For example, user agent 108 is free to establish a dialogue. A dialogue may be any communication with another device.

Offloading of State

P-CSCF 302 also offloads session state according to embodiments of the present invention. This allows P-CSCF 302 to offload stateful operations during a session established by user agent 108.

Figure 4:
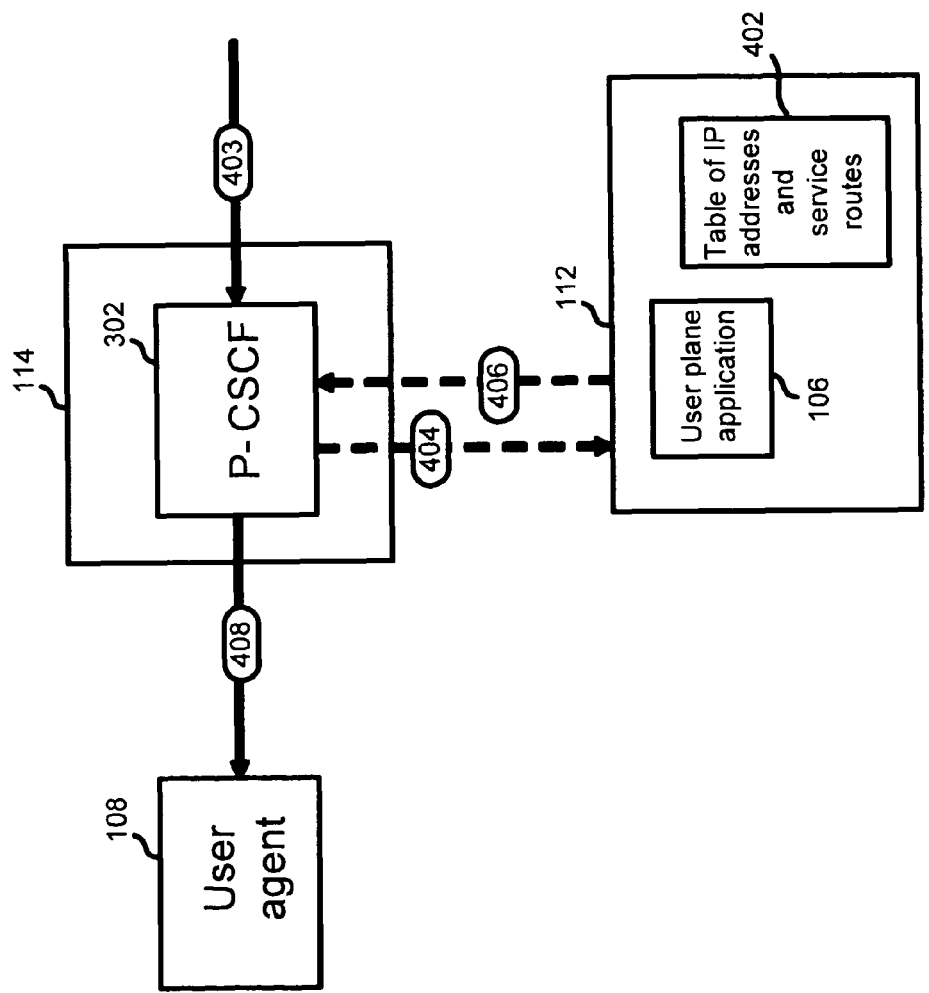
FIG. 4 depicts a process for offloading service route state according to one embodiment of the present invention.

FIG. 4 depicts a process for offloading service route state according to one embodiment of the present invention. At 403, during the registration, P-CSCF 302 receives the service route header for user agent 108 (e.g., in the 200 OK message). Information for the header may be cached by P-CSCF 302. Also, according to embodiments of the present invention, at 404, the service route header along with the host identity (e.g., IP address) is sent to user-plane application 106. This offloads the service route state to user-plane application 106. User-plane application 106 may store the service route header in a table of IP addresses and service routes 402. For example, the service route "ABCDEF" for IP source address "198.133.219.25" may be cached in table 402. This may be the service route address for user agent 108 and the IP address for user agent 108.

At 406, user-plane application 106 may send a cache confirm message to P-CSCF 302. At 408, P-CSCF 302 then sends a 200 OK service route message to user agent 108. This sends the service route information to user agent 108.

Accordingly, state information has been offloaded to user-plane application 106. This information may be sent through interface 104. Because P-CSCF 302 offloaded state information to user-plane application 106, P-CSCF 302 may offload stateful operations to user-plane application 106. Thus, P-CSCF 302 can operate in a stateless manner.

Reinitialization after Failure

An offload of a stateful operation may be performed during a re-initialization of P-CSCF 302 after a failure.

Figure 5:
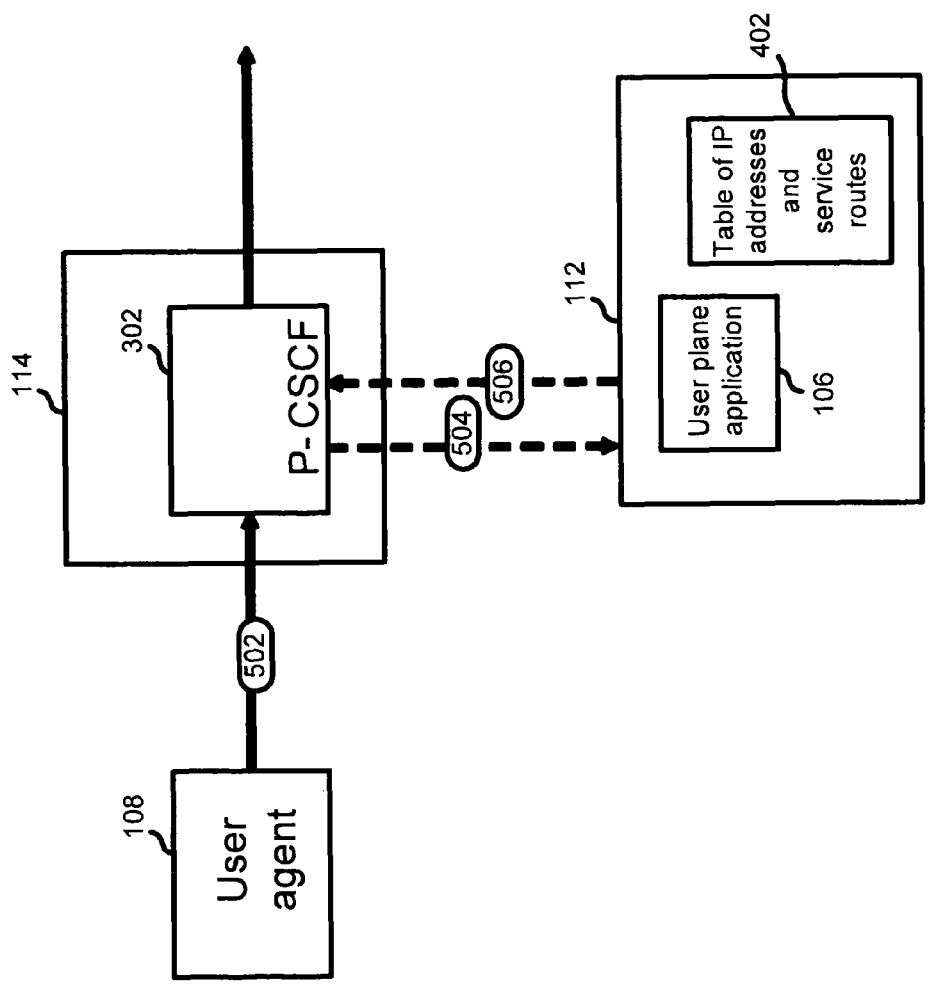
FIG. 5 depicts a process for re-initializing after failure according to one embodiment of the present invention.

FIG. 5 depicts a process for re-initializing after failure according to one embodiment of the present invention. At 502, user agent 108 sends an invite message to P-CSCF 302.

In this case, P-CSCF 302 does not contain a cached service route address for the IP source address found in the invite message. This is because P-CSCF 302 has failed and has thus lost the state information previously stored for user agent 108.

At 504, P-CSCF 302 sends a service route request for the IP source address to user-plane application 106. For example, the IP address 198.133.219.25 may be sent with the service route address request. This identifies the IP source address for user agent 108 and may be determined from the INVITE message.

User-plane application 106 then can look up the service route address in table 402 using the IP source address. This information was previously stored when the service route state was offloaded in FIG. 4.

At 506, user-plane application 106 sends a service route address confirm message. This message includes the service route address, such as the address "ABCDEFG". This is the service route address that was previously stored in FIG. 4.

P-CSCF 302 receives the service route address and can perform an action using the service route address. For example, the normal policing of the service route may be performed by comparing the service route address for the message with the service route address received from user-plane application 106.

Accordingly, P-CSCF 302 can be stateless and continue operations in a stateful manner even though state information has been lost due to failure. This is performed using interface 104 to send requests to user-plane application 106 and to receive the state information.

Offloading of Stateful Operations

Figure 6:
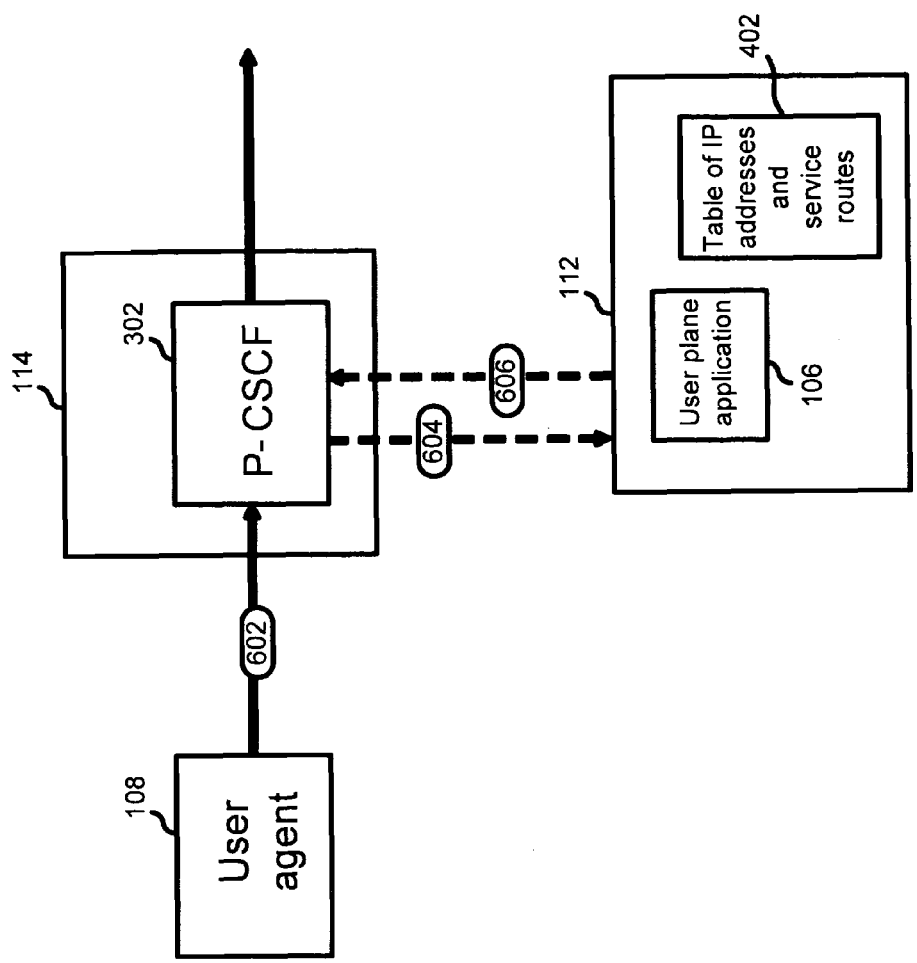
FIG. 6 depicts a process for offloading dialogue state according to one embodiment of the present invention.

Embodiments of the present invention may also offload stateful operations to user-plane application 106. In this case, user-plane application 106 may use the state information to perform the stateful operations. FIG. 6 depicts a process for offloading dialogue state according to one embodiment of the present invention. The dialogue state may be information regarding the state of a session. The session may be communication dialogue between two users. In this case, user agent 108 may be trying to establish a communication dialogue with another user.

At 602, user agent 108 sends an invite message to P-CSCF 302. P-CSCF 302 parses information in the message. For example, the information that may be parsed may include the service-route address, SIP contact, to, from, CSeq, and record route. Although this information is described, it will be understood that other state information may be used.

At 604, the information for the IP address of user agent 108 (e.g. 198.133.219.25) is sent to user-plane application 106. User-plane application 106 caches the information in table 402.

At 606, user-plane application 106 sends a cache confirm message to P-CSCF 302. P-CSCF 302 then forwards the invite message. In one embodiment, user-plane application 106 may then police the dialogue state. For example, user-plane application 106 determines if the current route header is identical to the previously-delivered service route header. User-plane application 106 can respond in the cache confirm message whether the current route header is the same as the cached service route header. If not, the message may indicate that the dialogue establishment should be canceled due to policy restrictions. If the service route header is the same as the current route header, then the dialogue may continue to be established.

In an alternative embodiment, a service provider's policy may allow the dialogue to be established but may use the service route header information during the normal policy control operation. For example, service provider may configure user-plane application 106 to reject any request to commit additional resources for media component established through a dialogue not passing through a particular P-CSCF 302.

In addition to policing the dialogue establishment, additional state information for the dialogue has been offloaded by P-CSCF 302. This dialogue state may be used later to perform stateful operations, such as session release.

Autonomous Session Release

Figure 7:
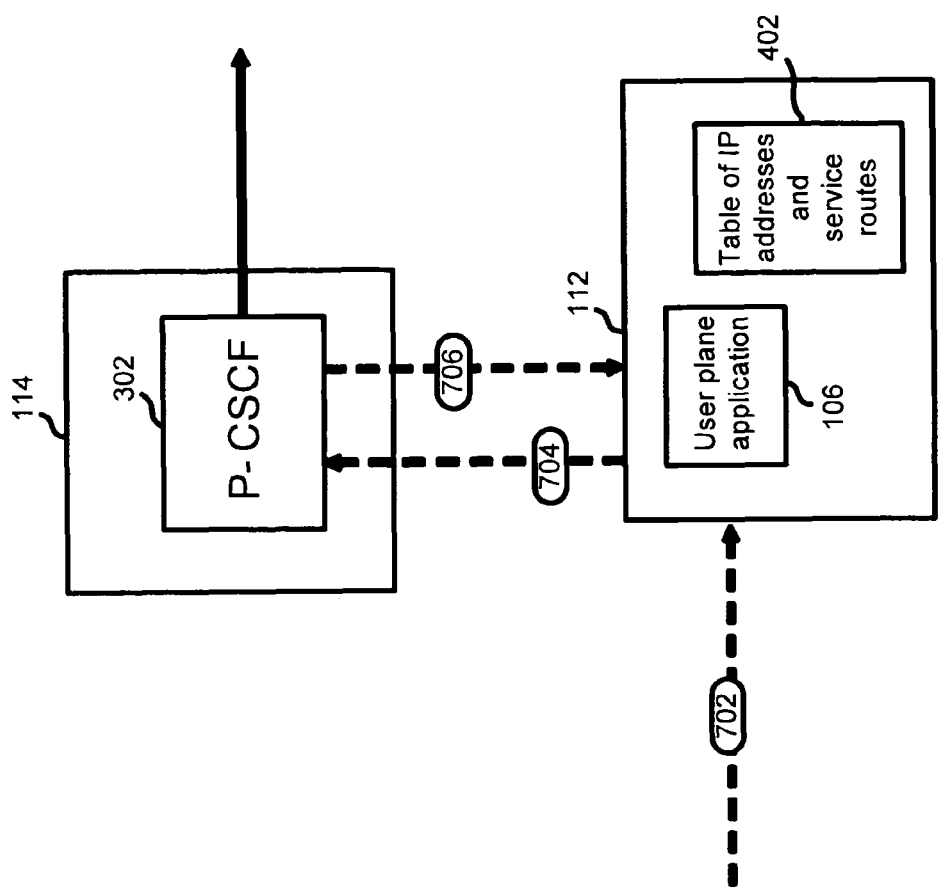
FIG. 7 depicts a process for performing autonomous session release according to one embodiment of the present invention.

Once a dialogue (or media session) has been established, user-plane application 106 may be configured to support autonomous session release. FIG. 7 depicts a process for performing autonomous session release according to one embodiment of the present invention. This may occur when it is indicated that a user has lost IP connectivity. The IP connectivity may be lost as user has left the radio coverage. For example, if user-plane application 106 is a wireless gateway, such as a GGSN or PDSN wireless gateway, user-plane application 106 may use the cached session credentials to autonomously end the session and clear up session state on behalf of the user who is now out of coverage. This operation may be performed solely by user-plane application 106 or may be offloaded to an application proxy using a specific gateway to the application proxy interface.

User agent 108 may lose IP connectivity for its source address. Layer two signaling may be received to indicate that user agent 108 has lost IP connectivity. For example, at 702, the source address 202.176.123.2 may be signaled as having lost IP connectivity.

User-plane application 106 may look up information for the IP source address that is needed to tear down the session. For example, a contact, CSeq, and record-route for the session may be determined from table 402. At 704, this information is sent to P-CSCF 302.

P-CSCF 302 may then send a BYE message to tear down the session. For example, a BYE message that includes the contact, CSeq and record-route header may be sent. This information is needed to tear down the session with the contact. At 706, after the tear down occurs, a tear down confirm message may be sent.

Accordingly, the state information maintained by user-plane application 106 is used to perform a stateful operation for P-CSCF 302. This information is sent through interface 104 and allows offloading of stateful operations.

Security Operation Offload

Figure 8:
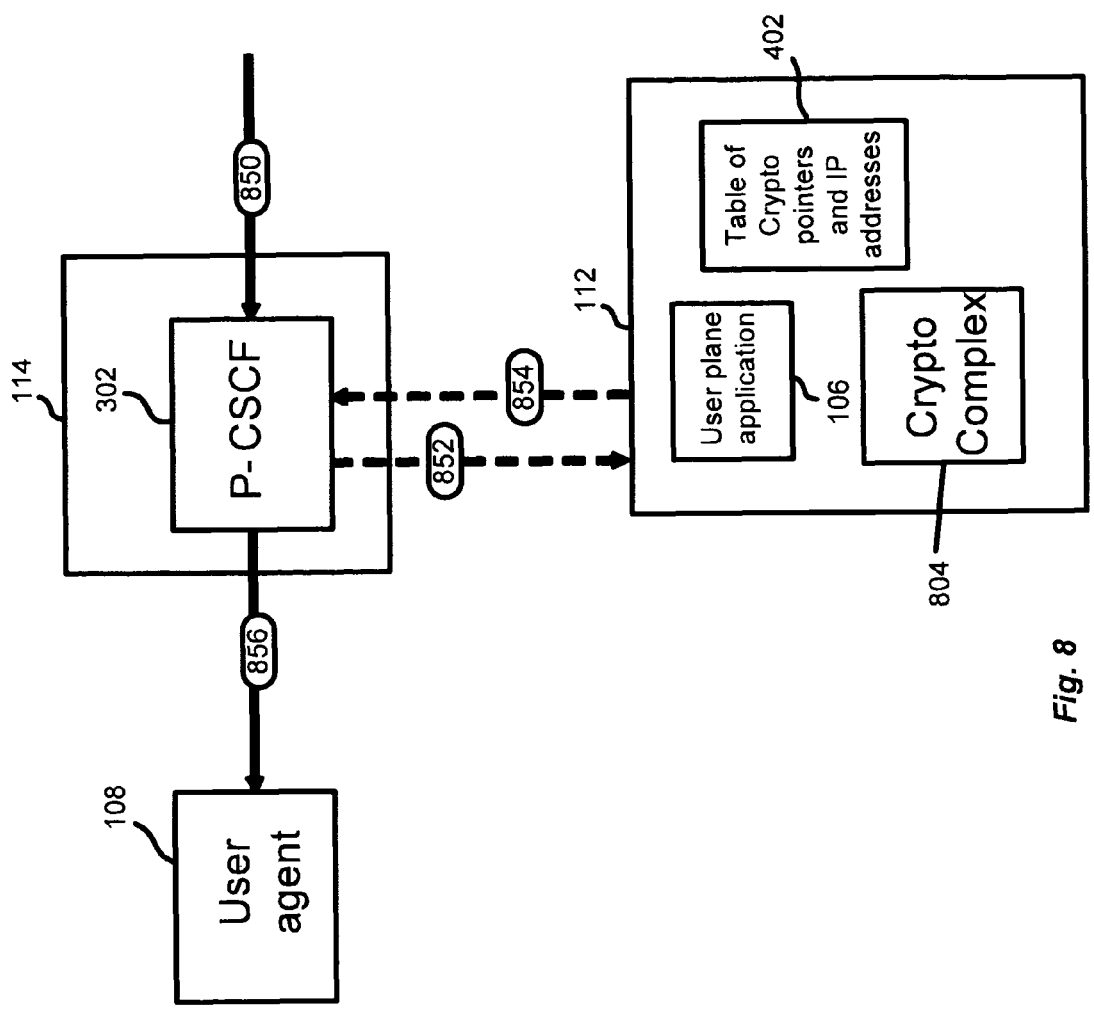
FIG. 8 depicts a process for initializing an IPSec state offload according to one embodiment of the present invention.

Embodiments of the present invention may also offload other stateful operations. For example, stateful security operations may be offloaded, such as IPSec operations. FIG. 8 depicts a process for initializing an IPSec state offload according to one embodiment of the present invention. At 850, a 200 OK register message is received at P-CSCF 302. P-CSCF 302 generates security association information. The security association information may be any security information needed by user agent 108 to send communications in the network. For example, a security association (SA) describes a unidirectional secure flow of data through two gateways.

At 852, the security association information is sent to user-plane application 106. A crypto complex 804 may allocate an unused pointer and configure crypto for the security association. This information may be entered into table 802 mapping the crypto pointer against the IP address for user agent 108.

At 854, the crypto pointer may be sent back to P-CSCF 302. P-CSCF 302 stores the crypto pointer against the host IP address. At 856, P-CSCF 302 sends a 200 OK register message to user agent 108.

Accordingly, the security information needed by user agent 108 for communications has been initialized. Also, the IPSec security information has been offloaded to user-plane application 106. Although the above IPsec security process is described, it will be understood that other security processes will be appreciated.

Figure 9:
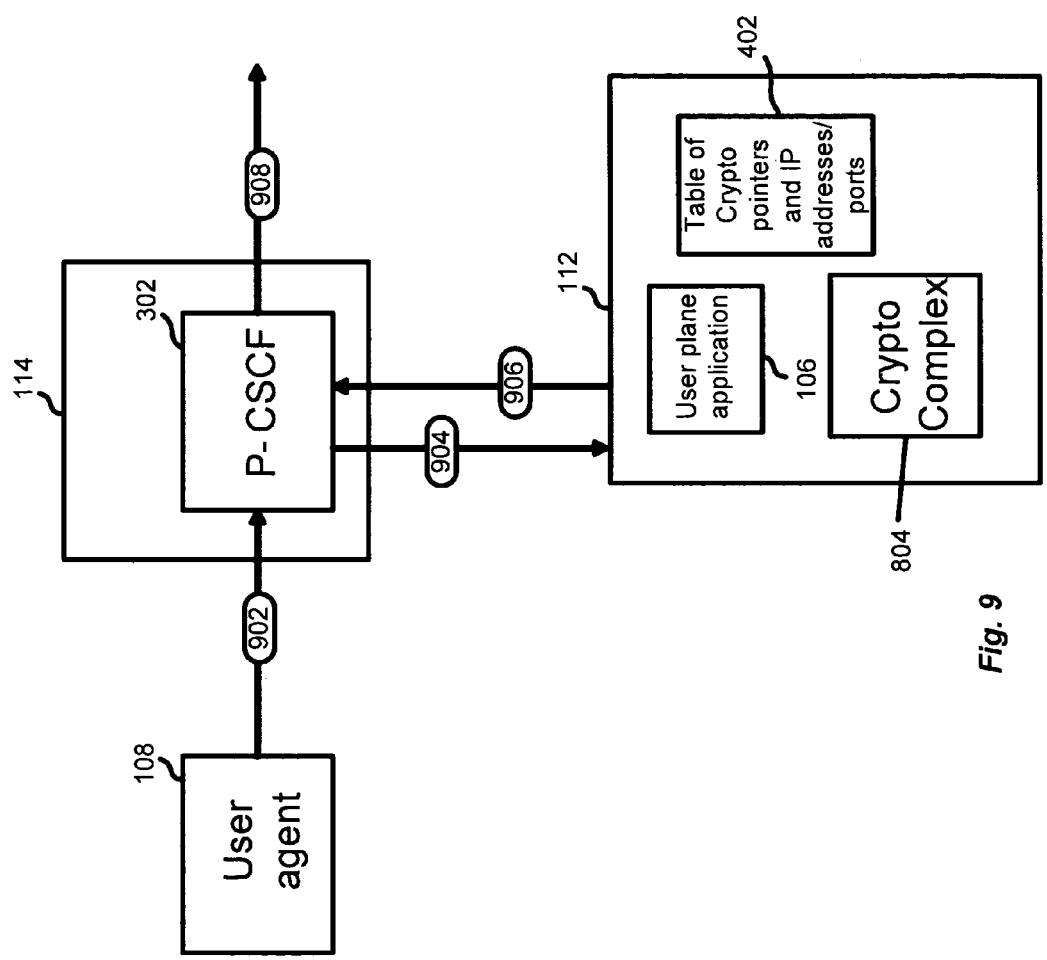
FIG. 9 shows a process for offloading stateful IPSec operations according to one embodiment of the present invention.

Once the initialization is completed, security operations may be offloaded to user-plane application 106. FIG. 9 shows a process for offloading stateful IPSec operations according to one embodiment of the present invention. At 902, an encrypted invite message is sent from user agent 108 to P-CSCF 302. P-CSCF 302 looks up the IP address against the security association.

At 904, P-CSCF 302 appends a pointer to the encrypted packet and sends it to crypto complex 804 of user-plane application 106. Crypto complex 804 decrypts the encrypted packet using information stored in table 802. For example, crypto information is looked up in table 802 for the crypto pointer.

At 906, user-plane application 106 then appends a pointer to the decrypted packet and sends it back to P-CSCF 302.

P-CSCF 302 may perform the normal service-route checking and send an invite message using a security association header at 908.

Accordingly, stateful security operations are performed by user-plane application 106. In this case, the decryption of an encrypted packet is performed by user-plane application 106 using cached security information.

Figure 10:
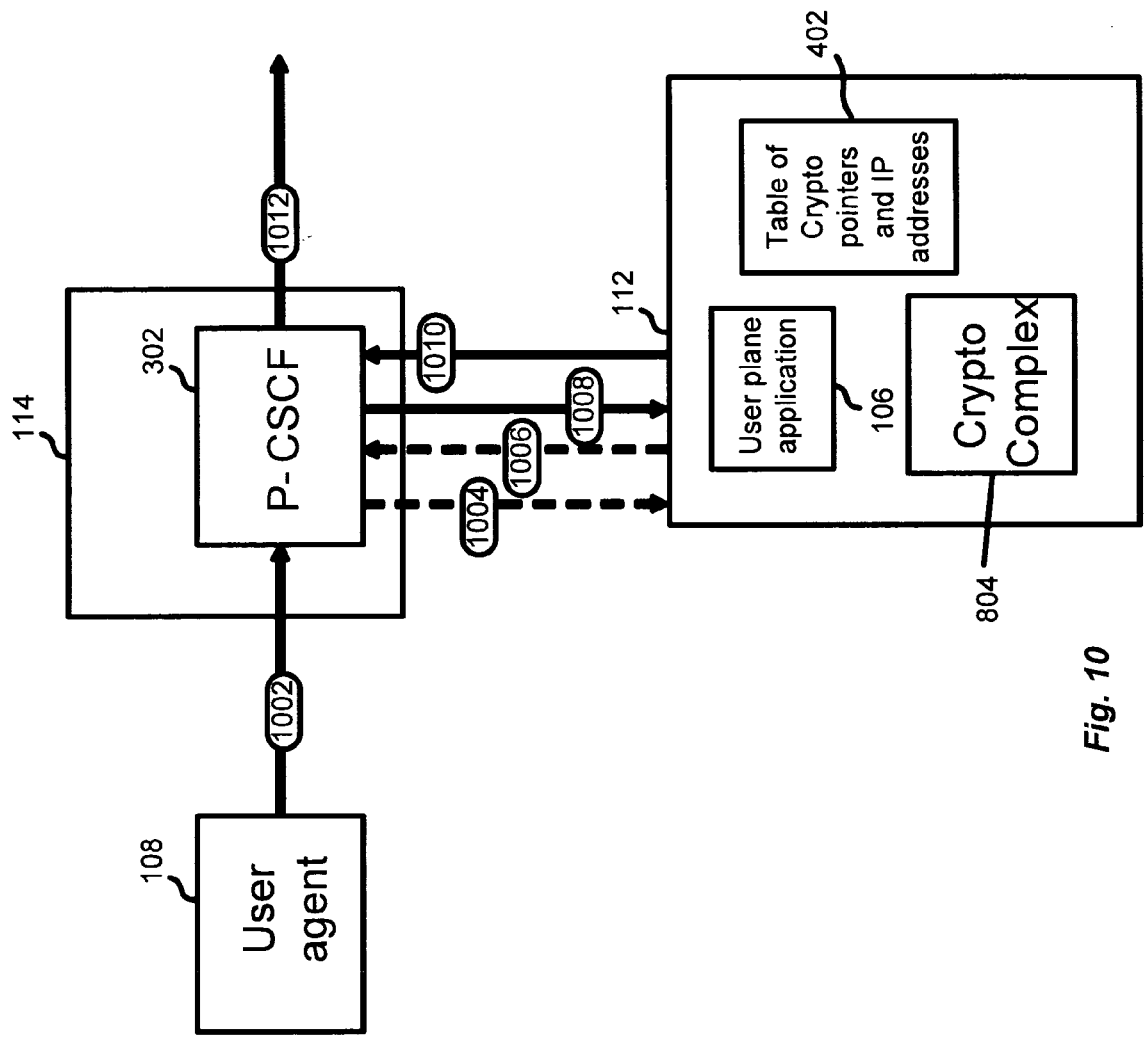
FIG. 10 depicts a process for offloading stateful IPSec operations after a failure of a P-CSCF according to one embodiment of the present invention.

FIG. 10 depicts a process for offloading stateful IPSec operations after a failure of P-CSCF 302 according to one embodiment of the present invention. At 1002, an encrypted invite message is sent from user agent 108 to P-CSCF 302. P-CSCF 302 looks up an IP address against a security association. This may fail because the P-CSCF 302 did not have the security association information.

At 1004, P-CSCF 302 sends a request that includes a null crypto pointer and the information for the IP address of user agent 108 (e.g. 198.133.219.25). Crypto complex 804 looks up the crypto pointer for the IP address in table 802. At 1006, user-plane application 106 responds with the crypto pointer. Accordingly, P-CSCF 302 has the crypto pointer and can then offload the decryption to user-plane application 106.

At 1008, P-CSCF 302 sends an encrypted packet with the appended crypto pointer to user-plane application 106. Crypto complex 804 decrypts the encrypted packet using information in table 802. The crypto pointer is appended to the decrypted packet and sent back to P-CSCF 302 at 1010.

P-CSCF 302 then can perform the normal service route checking and send an invite message at 1012.

Accordingly, embodiments of the present invention allow P-CSCF 302 to recover state when the look-up of the IP address against the security association fails. This may occur when P-CSCF 302 fails. Once the crypto pointer is secured, the normal operation of the IPSec stateful operation offload may then be performed.

Figure 11:
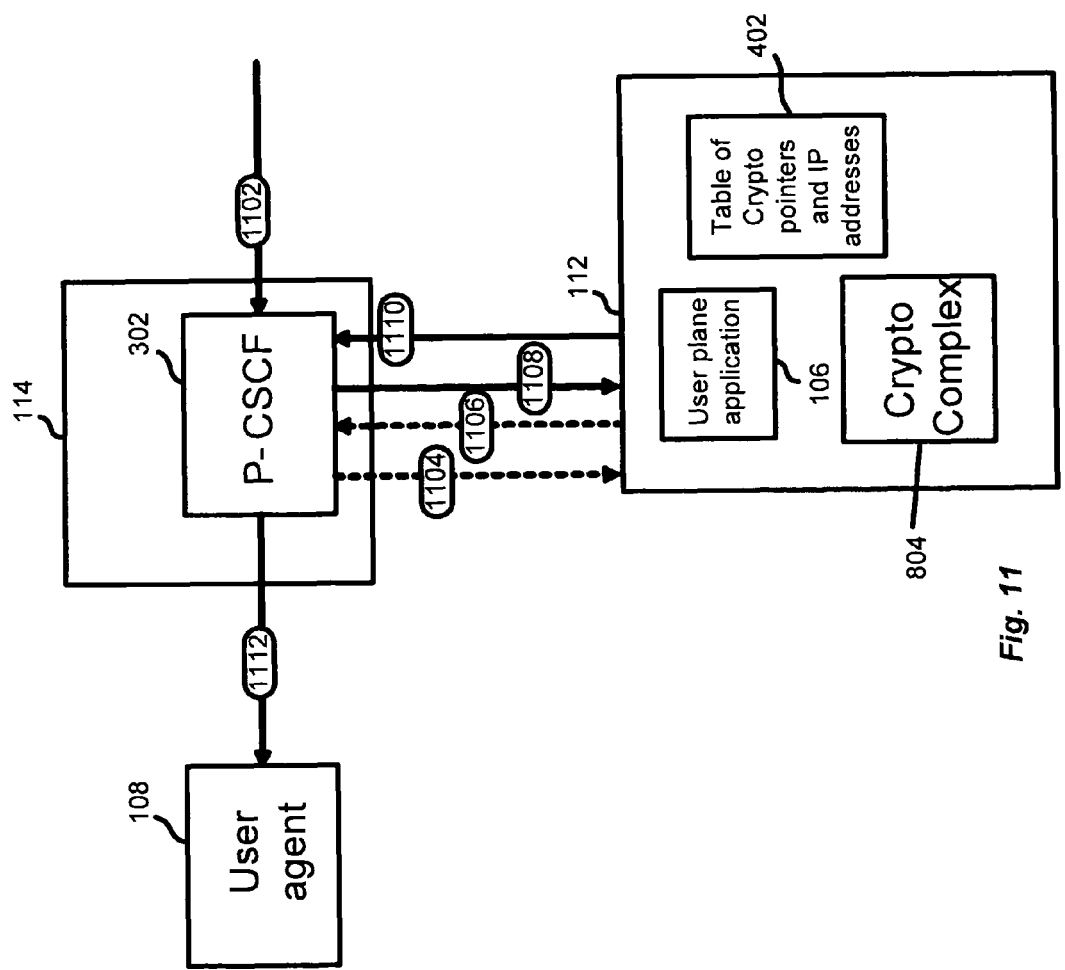
FIG. 11 depicts a process for offloading an IPSec stateful operation after a P-CSCF failure operation when receiving a communication for a user agent from a contact according to one embodiment of the present invention.

FIG. 11 depicts a process for offloading an IPSec stateful operation after P-CSCF 302 failure operation when receiving a communication for user agent 108 from a contact according to one embodiment of the present invention. The process described in FIG. 10 is for a communication initiated by user agent 108 while the process described in FIG. 11 is for a communication received for user agent 108.

At 1102, an invite message is received at P-CSCF 302. The invite message may be for user agent 108.

P-CSCF 302 resolves the destination from the invite message to an IP address for user agent 108. P-CSCF 302 checks whether a security association exists for this IP address. In this case, P-CSCF 302 may have failed and lost the security association information.

At 1104, P-CSCF 302 requests a crypto pointer for the IP address of user agent 108 (e.g. 198.133.219.25). User-plane application 106 may perform a table look-up in table 802 to determine the crypto pointer for the IP address. At 1106, user-plane application 106 sends the crypto pointer to P-CSCF 302.

P-CSCF 302 may then append the pointer to a clear text packet and send it to crypto complex 804. Crypto complex 804 encrypts the packet, appends the crypto pointer to the encrypted packet, and sends it back to P-CSCF 302 at 1110.

At 1112, an encrypted invite message may be sent to user agent 108. The invite is encrypted per security requirements per the network. Accordingly, IPSec state is recovered after a failure.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method for allowing a network application to be stateless in an IP network, the method comprising:
   receiving, at the network application in a network device, state information for a session for a user device, wherein the state information comprises a service route header and identification information for the user device;
   sending, from the network device, the state information to a user-plane application through a network interface coupled to the network device, wherein the user-plane application comprises a gateway configured to route communications for the user device, the user-plane application being located in a network associated with the user device on an opposite side of the network interface from the network device, and wherein the user-plane application is configured to store the state information in a cache having the service route header associated with the user device identification information, and perform a stateful operation for the network application using the stored state information to offload the stateful operation from the network application of the network device to allow the network application to be stateless with respect to the offloaded stateful operation;

when the stateful operation is a security operation:
receiving in the network device, a message from the user device;
generating security information based on the received message; and
communicating with the user-plane application to have a crypto pointer allocated by the user-plane application for the security information, wherein the crypto pointer is stored in the cache associated with the user-plane application; and upon a failure of the network application that causes the network device to lose the state information and the crypto pointer, and re-initialization of the network application in the network device after the failure, communicating with the user-plane application to receive the state information and the crypto pointer from the cache associated with the user-plane application for continuing the session with the re-initialized network application without needing to establish a new session for the user device.

2. The method of claim 1, wherein the network application comprises a proxy network application.

3. The method of claim 1, wherein the stateful operation is a network application operation that is offloaded to the user-plane application, the user-plane application using the state information to perform the stateful operation, and wherein the state information further comprises IPSec state information when the stateful operation is a security operation.

4. The method of claim 1, further comprising:
storing the state information at the network application; and
performing network application operations using the stored state information, wherein if the stored state information at the network application is lost, the network application maintains state by communicating with the user-plane application to receive the state information.

5. The method of claim 1, wherein after failure of the network application, the method further comprising:
receiving a message from the user device;
determining that the service route header is not stored at the network application;
requesting the service route header from the user-plane application using the identification information of the user device;
receiving the service route header from the user-plane application; and
policing the message using the service route header.

6. The method of claim 1, further comprising:
receiving a message from the user device; and
sending dialogue state information determined from the message to the user-plane application, the user-plane application maintaining the dialogue state information.

7. The method of claim 6, further comprising:
receiving a message from the user-plane application indicating the session should be ended for the session associated with the dialogue state information, wherein the user-plane application receives an indication that the user device session should be ended; and
ending the session associated with the dialogue state information.

8. The method of claim 1, further comprising:
receiving a second encrypted message from the user device;
sending the crypto pointer with the encrypted message to the user-plane application, wherein the user-plane application uses the crypto pointer to determine decryption information to decrypt the encrypted message; and
receiving the decrypted message from the user-plane application.

9. The method of claim 1, further comprising:
receiving a second encrypted message from the user device;
determining that the crypto pointer that was stored is lost;
sending a request to the user-plane application for the crypto pointer that is being maintained by the user-plane application, wherein the user-plane application looks up the crypto pointer for identification information for the user device; and
receiving the crypto pointer from the user-plane application.

10. A method for allowing a network application to be stateless in an IP network, the method comprising:
receiving, at a user-plane application in a computing device, state information for a session for a user device, the state information required for communications to and from the user device and received through a network interface, wherein the user-plane application is located in a network associated with the user device on an opposite side of the network interface from the network application, wherein the computing device comprises a gateway configured to route communications for the user device;
storing the state information with the user-plane application associated with the user device, wherein the state information comprises a service route header and address for the user device, wherein the user-plane application stores the service route header and the address in a cache having the service route header associated with the user device address;
performing, using the computing device, a stateful operation using the state information for the network application, the stateful operation being offloaded from being performed by the network application to allow the network application to be stateless with respect to the offloaded stateful operation;
when the stateful operation is a security operation:
receiving a message from the network application to have a crypto pointer allocated in the computing device, wherein the crypto pointer allocation is based on security information from the received message;
storing the crypto pointer in the cache associated with the user-plane application for the security information associated with identification information for the network application; and
sending the crypto pointer to the network application;
upon a failure of the network application that causes the network device to lose the state information and the crypto pointer, and re-initialization of the network application in the network device after the failure, receiving a request from the network device for the state information and the crypto pointer; and sending the state information and the crypto pointer retrieved from the cache associated with the user-plane application to the re-initialized network application in the network device for continuing the session with the network application without needing to establish a new session for the user device.

11. The method of claim 10, wherein the network application comprises proxy network application.

12. The method of claim 10, wherein the stateful operation is a network application operation that is offloaded to the user-plane application, the user-plane application using the state information to perform the stateful operation, and wherein the state information further comprises IPSec state information when the stateful operation is a security operation.

13. The method of claim 10, wherein after failure of the network application, the method further comprising:
receiving a request from the network application for the service route header using the identification information of the user device;
determining the service route header using the identification information for the network application; and
sending the service route header to the network application, wherein the network application polices the message using the service route header.

14. The method of claim 10, further comprising: receiving dialogue state information determined for a message; and maintaining the dialogue state information at the user-plane application.

15. The method of claim 14, further comprising: receiving an indication that the user device session should be ended; and sending a message indicating the session should be ended for the session associated with the dialogue state information, wherein the network application ends the session associated with the dialogue state information.

16. The method of claim 10, further comprising:
receiving the crypto pointer with an encrypted message;
using the crypto pointer to determine decryption information to decrypt the encrypted message; and
sending the decrypted message to the network application.

17. The method of claim 10, further comprising:
receiving a request for the crypto pointer that is being maintained by the user-plane application, wherein the network application has lost the crypto pointer;
looking up the crypto pointer for identification information for the user device; and
sending the crypto pointer to the network application.

18. An apparatus configured to allow a network application to be stateless in an IP network, the apparatus comprising:
one or more computer processors in a network device; and
a non-transitory computer-readable storage medium containing instructions that, when executed by the one or more computer processors, cause the one or more computer processors to perform a set of steps comprising:
receiving, at the network application in the network device, state information for a session for a user device, wherein the state information comprises a service route header and identification information for the user device;
sending, from the one or more computer processors, the state information to a user-plane application through a network interface coupled to the network device, wherein the user-plane application comprises a gateway configured to route communications for the user device, the user-plane application being located in a network associated with the user device on an opposite side of the network interface from the network device, and wherein the user-plane application is configured to store the state information in a cache having the service route header associated with the user device identification information, and perform a stateful operation for the network application using the stored state information to offload the stateful operation from the network application of the network device to allow the network application to be stateless with respect to the offloaded stateful operation;
when the stateful operation is a security operation:
receiving in the network device, a message from the user device;
generating security information based on the received message; and
communicating with the user-plane application to have a crypto pointer allocated by the user-plane application for the security information, wherein the crypto pointer is stored in the cache associated with the user-plane application; and
upon a failure of the network application that causes the network device to lose the state information and the crypto pointer, and re-initialization of the network application in the network device after the failure, communicating with the user-plane application to receive the state information and the crypto pointer from the cache associated with the user-plane application for continuing the session with the re-initialized network application without needing to establish a new session for the user device.

19. The apparatus of claim 18, wherein the network application comprises a proxy network application.

20. The apparatus of claim 18, wherein the stateful operation is a network application operation that is offloaded to the user-plane application, the user-plane application using the state information to perform the stateful operation, and wherein the state information further comprises IPSec state information when the stateful operation is a security operation.

21. The apparatus of claim 18, further comprising:
storing the state information at the network application; and
performing network application operations using the stored state information, wherein if the stored state information at the network application is lost, the network application maintains state by communicating with the user-plane application to receive the state information.

22. The apparatus of claim 18, wherein after failure of the network application, wherein the instructions cause the one or more processors to perform further steps comprising:
receiving a message from the user device; determining that the service route header is not stored at the network application;
requesting the service route header from the user-plane application using the identification information of the user device;
receiving the service route header from the user-plane application; and
policing the message using the service route header.

23. The apparatus of claim 18, wherein the instructions cause the one or more processors to perform further steps comprising:

receiving a message from the user device; and sending dialogue state information determined from the message to the user-plane application, the user-plane application maintaining the dialogue state information.

24. The apparatus of claim 23, wherein the instructions cause the one or more processors to perform further steps comprising:

receiving a message from the user-plane application indicating the session should be ended for the session associated with the dialogue state information, wherein the user-plane application receives an indication that the user device session should be ended; and ending the session associated with the dialogue state information.

25. The apparatus of claim 18, wherein the instructions cause the one or more processors to perform further steps comprising:

receiving a second encrypted message from the user device;

sending the crypto pointer with the encrypted message to the user-plane application, wherein the user-plane application uses the crypto pointer to determine decryption information to decrypt the encrypted message; and receiving the decrypted message from the user-plane application.

26. The apparatus of claim 18, wherein the instructions cause the one or more processors to perform further steps comprising:

receiving a second encrypted message from the user device;

determining that the crypto pointer that was stored is lost;

sending a request to the user-plane application for the crypto pointer that is being maintained by the user-plane application, wherein the user-plane application looks up the crypto pointer for identification information for the user device; and receiving the crypto pointer from the user-plane application.

27. An apparatus configured to allow a network application to be stateless in an IP network, the apparatus comprising:

one or more computer processors; and a non-transitory computer-readable storage medium containing instructions that, when executed by the one or more computer processors, cause the one or more computer processors to perform a set of steps comprising:

receiving, in a gateway at a user-plane application from a network device, state information for a session for a user device, the state information required for communications to and from the user device and received through a network interface, wherein the user-plane application is located in a network associated with the user device on an opposite side of the network interface from the network application of the network device, wherein the gateway having the user-plane application is configured to route communications for the user device;

storing the state information with the user-plane application associated with the user device, wherein the state information comprises a service route header and address for the user device, wherein the user-plane application stores the service route header and the address in a cache having the service route header associated with the user device address;

performing, using the one or more computer processors, a stateful operation using the state information for the network application, the stateful operation being offloaded from being performed by the network application to allow the network application to be stateless with respect to the offloaded stateful operation;

when the stateful operation is a security operation:

receiving a message from the network application to have a crypto pointer allocated in the computing device, wherein the crypto pointer allocation is based on security information from the received message;

storing the crypto pointer in the cache associated with the user-plane application for the security information associated with identification information for the network application; and sending the crypto pointer to the network application;

upon a failure of the network application that causes the network device to lose the state information and the crypto pointer, and re-initialization of the network application in the network device after the failure, receiving a request from the network device for the state information and the crypto pointer; and sending the state information and the crypto pointer retrieved from the cache associated with the user-plane application to the re-initialized network application in the network device for continuing the session with the network application without needing to establish a new session for the user device.

28. The apparatus of claim 27, wherein the network application comprises proxy network application.

29. The apparatus of claim 27, wherein the stateful operation is a network application operation that is offloaded to the user-plane application, the user-plane application using the state information to perform the stateful operation, and wherein the state information further comprises IPSec state information when the stateful operation is a security operation.

30. The apparatus of claim 27, wherein after failure of the network application, wherein the instructions cause the one or more computer processors to perform further steps comprising:

receiving a request from the network application for the service route header using the identification information of the user device;

determining the service route header using the identification information for the network application;

sending the service route header to the network application, wherein the network application polices the message using the service route header.

31. The apparatus of claim 27, wherein the instructions cause the one or more computer processors to perform further steps comprising:

receiving dialogue state information determined for a message; and maintaining the dialogue state information at the user-plane application.

32. The apparatus of claim 31, wherein the instructions cause the one or more computer processors to perform further steps comprising:

receiving an indication that the user device session should be ended; and sending a message indicating the session should be ended for the session associated with the dialogue state information, wherein the network application ends the session associated with the dialogue state information.

33. The apparatus of claim 27, wherein the instructions cause the one or more computer processors to perform further steps comprising:

receiving the crypto pointer with an encrypted message;
using the crypto pointer to determine decryption information to decrypt the encrypted message; and
sending the decrypted message to the network application.

34. The apparatus of claim 27, wherein the instructions cause the one or more computer processors to perform further steps comprising:
receiving a request for the crypto pointer that is being maintained by the user-plane application, wherein the network application has lost the crypto pointer;
looking up the crypto pointer for identification information for the user device; and
sending the crypto pointer to the network application.

35. An apparatus configured to allow a network application to be stateless in an IP network, the apparatus comprising:
a computer processor;
means for receiving, at the network application in a network device, state information for a session for a user device, wherein the state information comprises a service route header and identification information for the user device;
means for sending from the computer processor, the state information to a user-plane application through a network interface coupled to the network device, wherein the user-plane application comprises a gateway configured to route communications for the user device, the user-plane application being located in a network associated with the user device on an opposite side of the network interface from the network device, and wherein the user-plane application is configured to store the state information in a cache having the service route header associated with the user device identification information, and perform a stateful operation for the network application using the stored state information to offload the stateful operation from the network application of the network device to allow the network application to be stateless with respect to the offloaded stateful operation;
when the stateful operation is a security operation:
means for receiving in the network device, a message from the user device;
means for generating security information based on the received message; and
means for communicating with the user-plane application to have a crypto pointer allocated by the user-plane application for the security information, wherein the crypto pointer is stored in the cache associated with the user-plane application; and
upon a failure of the network application that causes the network device to lose the state information and the crypto pointer, and re-initialization of the network application in the network device after the failure, communicating with the user-plane application to receive the state information and the crypto pointer from the cache associated with the user-plane application for continuing the session with the re-initialized network application without needing to establish a new session for the user device.

36. An apparatus configured to allow a network application to be stateless in an IP network, the apparatus comprising:
a computer processor;
means for receiving, in a gateway at a user-plane application, state information for a session for a user device, the state information required for communications to and from the user device and received through a network interface, wherein the user-plane application is located in a network associated with the user device on an opposite side of the network interface from the network application, wherein the gateway having the user-plane application is configured to route communications for the user device;
means for storing the state information with the user-plane application associated with the user device, wherein the state information comprises a service route header and address for the user device, wherein the user-plane application stores the service route header and the address in a cache having the service route header associated with the user device address;
means for performing, using the computer processor, a stateful operation using the state information for the network application, the stateful operation being offloaded from being performed by the network application to allow the network application to be stateless with respect to the offloaded stateful operation;
when the stateful operation is a security operation:
means for receiving a message from the network application to have a crypto pointer allocated in the computing device, wherein the crypto pointer allocation is based on security information from the received message;
means for storing the crypto pointer in the cache associated with the user-plane application for the security information associated with identification information for the network application; and
means for sending the crypto pointer to the network application;
upon a failure of the network application that causes the network device to lose the state information and the crypto pointer, and re-initialization of the network application in the network device after the failure, receiving a request from the network device for the state information and the crypto pointer; and
means for sending the state information and the crypto pointer retrieved from the cache associated with the user-plane application to the re-initialized network application in the network device for continuing the session with the network application without needing to establish a new session for the user device.

* * * * *